(No Model.)

F. A. IDDINGS.
DIE FOR WELDING LINKS.

No. 271,466. Patented Jan. 30, 1883.

WITNESSES:
Theo. G. Hoster
C. Sedgwick

INVENTOR:
F. A. Iddings
BY Munn & Co
ATTORNEYS.

UNITED STATES PATENT OFFICE.

FRANK A. IDDINGS, OF WARREN, OHIO.

DIE FOR WELDING LINKS.

SPECIFICATION forming part of Letters Patent No. 271,466, dated January 30, 1883.

Application filed May 11, 1882. (No model.)

*To all whom it may concern:*

Be it known that I, FRANK A. IDDINGS, of Warren, in the county of Trumbull and State of Ohio, have invented a new and useful Improvement in Dies for Welding Links, of which the following is a full, clear, and exact description.

This invention more particularly relates to the welding of links used in railroad-car couplings; and it consists in a peculiar construction of welding-dies and devices connected therewith, whereby increased facility is afforded for rapidly and fully opening said dies when necessary to remove the welded link; and it further consists in a certain combination, with the welding-dies, of a finishing-die, whereby the link, after being welded, may be quickly and readily transferred to the finishing-die.

Reference is to be had to the accompanying drawings, forming part of this specification, in which similar letters of reference indicate corresponding parts in all the figures.

Figure 1:
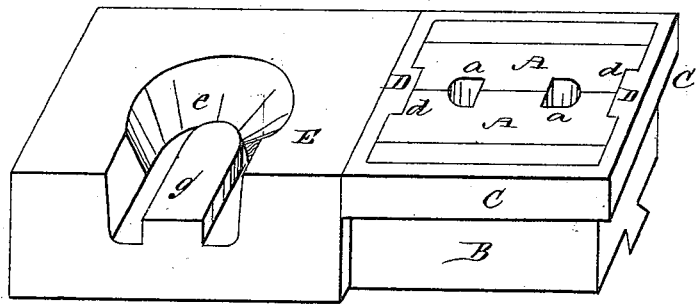
Figure 2:
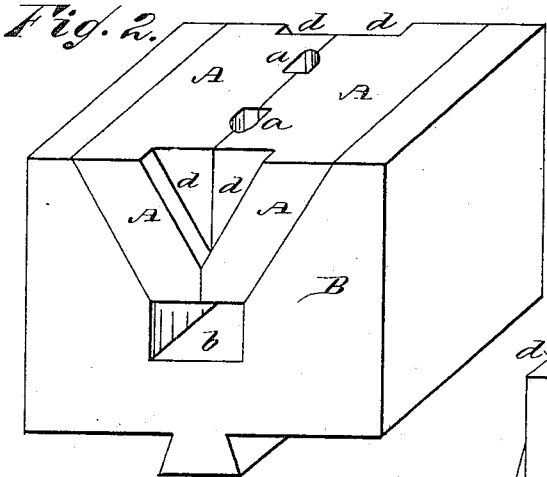
Figure 5:
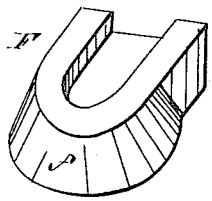
Figure 4:
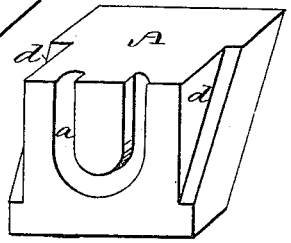
Figure 3:
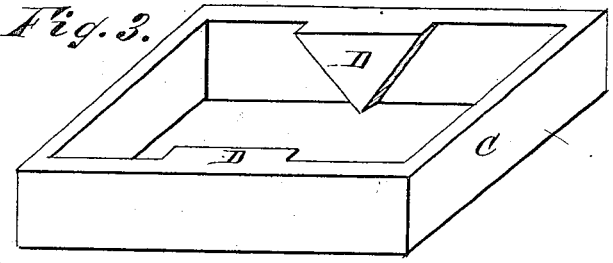

Figure 1 represents a view in perspective of a pair of link-welding dies and a finishing-die constructed and arranged in relation with each other in accordance with my invention. Fig. 2 is a view in perspective of my improved welding-dies, with devices for holding and opening the same. Fig. 3 is a perspective view of a band with attached die-opening devices used in connection with the frame of the welding-die. Fig. 4 is a perspective view of one of the welding-dies detached, and Fig. 5 is a perspective view from its under side of a swage used in connection with the finishing-die.

In this improvement, as in other dies for welding car-links, the ends of the link to be closed or welded are first introduced into and driven down within recesses *a a* in the meeting sides or faces of a pair of dies, A A, which recessess are of a split or open U shape, as shown in one of said dies at Fig. 4. These dies are ordinarily made with sloping or converging exterior sides, and fit down within a frame of corresponding shape braced by an exterior band, which has attached to it a device that is operated by a lever, for the purpose of raising the dies in said frame and opening them to extricate the link. These devices I also use, B being the frame, C the band, and *b* the opening for the lever which raises the dies; but this mode of raising the dies A A is not in itself sufficient to let out the link, which is usually two inches thick (more or less) at its point of welding, and to remove the link it has been necessary to shake it back and forth, during which the heated iron link cools off to a great extent before it can be removed to be finished, the water that is used in keeping the dies cool aggravating the disadvantage, so that many of the links produced are of little or no use. All this I obviate by constructing the dies A A with recesses *d* in their ends, of a shape which will cause the dies, when brought together, to present triangular cavities or recesses; and fitting within these triangular recesses *d d* are correspondingly-shaped projections on opposite sides of the interior of the band C, forming wedges D. By this construction, when raising the dies A A, as hereinbefore described, to liberate the link, said dies will not only be spread, but also be kept apart to allow of the speedy removal of the link before it is cooled, by the resistance or action on the dies of the wedges D, the sides of which are parallel with the sloping outsides of the dies, respectively. Such wedge-like opening action of the dies not only prevents the cooling of the link before it can be removed to be finished, but by the ample and quick opening of the dies it saves a large amount of labor in handling, and allows of a much greater number of links being welded within a given time. After the link has been welded and removed from the dies A A it is placed in a shaping-die and struck by a swage acted upon by a hammer. As this is the ordinary mode of proceeding, the same requires no minute description here; but it should be observed that the shaping-die E shown in the drawings occupies a position as regards the mouth end of the shaping-recess, which is at right angles to that ordinarily occupied relatively to the dividing-line of the welding-dies A A, against the frame B of which it is placed, as usual, and this correspondingly changes its position relatively to the direction of the horizontal hammer; and it furthermore should be observed that the walls *e* of the shaping-recess are made flaring or beveling, as represented in the drawings, and the sides *f* of the swage F, which is constructed to fit a tongue, *g*, on the bottom of the recess of the finishing-die, are correspondingly shaped to fit said recess for the purpose of guiding it into the same place at every stroke of the hammer. By this construction and arrangement of the shaping-die E, having the open end or mouth of its shaping-recess parallel with the dividing-line of the dies A A, the workman is enabled to finish the link from the same side that he stands in placing it in and removing it from the welding-dies A A instead of moving from the side of the welding-dies to the front of the shaping-die, as is necessary when the shaping-die occupies a position relatively to the welding-dies at right angles to that represented for it in the drawings. This not only saves a large amount of time, but makes a better weld and finish, inasmuch as the iron keeps hotter than when the workman has to change his position from side to front.

Having thus fully described my invention, what I claim as new, and desire to secure by Letters Patent, is—

The link-welding dies A A, constructed with angular recesses $d\,d$ in their ends, in combination with the frame B and the band C, provided with inner opposite wedges, D, constructed to fit the angular recess $d\,d$ in the dies, whereby a more rapid and complete opening of the dies for the removal of the welded link is obtained, substantially as specified.

FRANK A. IDDINGS.

Witnesses:
C. D. HINE,
B. F. GILLIES.